United States Patent
Gallagher et al.

(10) Patent No.: US 10,980,213 B2
(45) Date of Patent: Apr. 20, 2021

(54) MILKING MODULE, A MILKING ARRANGEMENT, AND A METHOD FOR MILKING A GROUP OF ANIMALS

(71) Applicant: DELAVAL HOLDING AB, Tumba (SE)

(72) Inventors: Jeffery Gallagher, Tumba (SE); Joel Carrigg, Tumba (SE); Scott Pawlowicz, Tumba (SE); Peter Manneke, Tumba (SE)

(73) Assignee: DeLaval Holding AB, Tumba (SE)

( * ) Notice: Subject to any disclaimer, the term of this patent is extended or adjusted under 35 U.S.C. 154(b) by 315 days.

(21) Appl. No.: 16/089,091

(22) PCT Filed: Mar. 31, 2017

(86) PCT No.: PCT/SE2017/050318
§ 371 (c)(1),
(2) Date: Sep. 27, 2018

(87) PCT Pub. No.: WO2017/171624
PCT Pub. Date: Oct. 5, 2017

(65) Prior Publication Data
US 2020/0296921 A1  Sep. 24, 2020

(30) Foreign Application Priority Data

Apr. 1, 2016 (SE) .................................. 1650430-0

(51) Int. Cl.
*A01K 1/12* (2006.01)
*A01J 5/007* (2006.01)
*A01K 1/00* (2006.01)

(52) U.S. Cl.
CPC ................ *A01K 1/12* (2013.01); *A01J 5/007* (2013.01); *A01K 1/0017* (2013.01)

(58) Field of Classification Search
CPC ........ A01K 1/12; A01K 1/123; A01K 1/0017; A01J 5/00; A01J 5/007
See application file for complete search history.

(56) References Cited

U.S. PATENT DOCUMENTS 5,203,280 A    4/1993  Nelson
5,230,299 A *  7/1993  Moreau .................... A01K 1/12
                                                 119/14.03
(Continued)

FOREIGN PATENT DOCUMENTS

CN    102 630 591 A    8/2012
DE     79 23 885 U1   11/1979
(Continued)

OTHER PUBLICATIONS

International Search Report and Written Opinion, dated May 30, 2017, from corresponding PCT application No. PCT/SE2017/050318.

(Continued)

*Primary Examiner* — Monica L Barlow
*Assistant Examiner* — Aaron M Rodziwicz
(74) *Attorney, Agent, or Firm* — Nixon & Vanderhye

(57) ABSTRACT

An automatic milking installation controlled by a system including: a graphical user interface enabling user interaction with the automatic milking installation via at least one display view, an imaging unit recording image data representing at least one portion of a dairy animal, the imaging unit having a transparent cover surface configured to protect an optics section of the imaging unit and through which transparent cover surface the image data are recorded, and a control unit receiving the recorded image data, and based thereon, producing a control signal for controlling functions of the automatic milking installation. The control unit further processes the recorded image data to determine a parameter indicating an amount of dirt on the transparent (Continued)

cover surface, and generates graphics data for presentation to the user via the graphical user interface, which includes at least one graphical element reflecting the amount of dirt on the transparent cover surface.

22 Claims, 11 Drawing Sheets

(56) References Cited

U.S. PATENT DOCUMENTS

| | | | | |
|---|---|---|---|---|
| 5,259,335 A | * | 11/1993 | Moreau | A01K 1/12 119/14.03 |
| 5,285,746 A | * | 2/1994 | Moreau | A01K 1/12 119/14.03 |
| 5,615,637 A | * | 4/1997 | Nelson | A01K 1/0017 119/14.03 |
| 5,638,768 A | * | 6/1997 | Moreau | A01K 1/12 119/14.03 |
| 7,644,681 B2 | * | 1/2010 | Moreau | A01K 1/0209 119/14.03 |
| 2007/0186859 A1 | | 8/2007 | Moreau | |
| 2012/0272904 A1 | * | 11/2012 | Hofman | A01J 5/0175 119/14.02 |

FOREIGN PATENT DOCUMENTS

| | | |
|---|---|---|
| EP | 0 393 471 A1 | 10/1990 |
| EP | 1 346 632 A2 | 9/2003 |
| FR | 2 730 902 A1 | 8/1996 |
| WO | 2010/112031 A1 | 10/2010 |

OTHER PUBLICATIONS

International-Type Search Report, dated Nov. 15, 2016, from corresponding National application No. 1650430-0.

\* cited by examiner

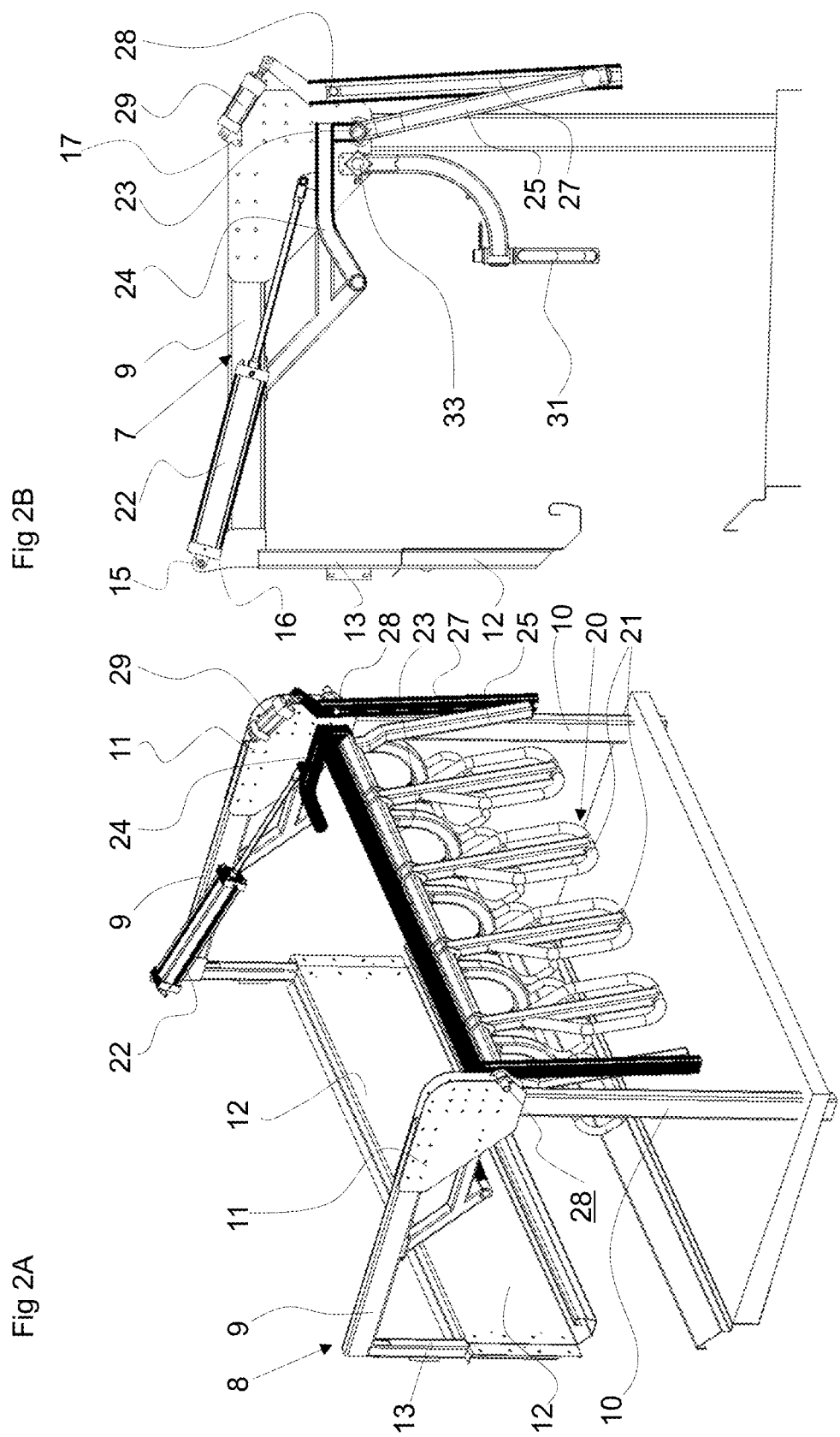

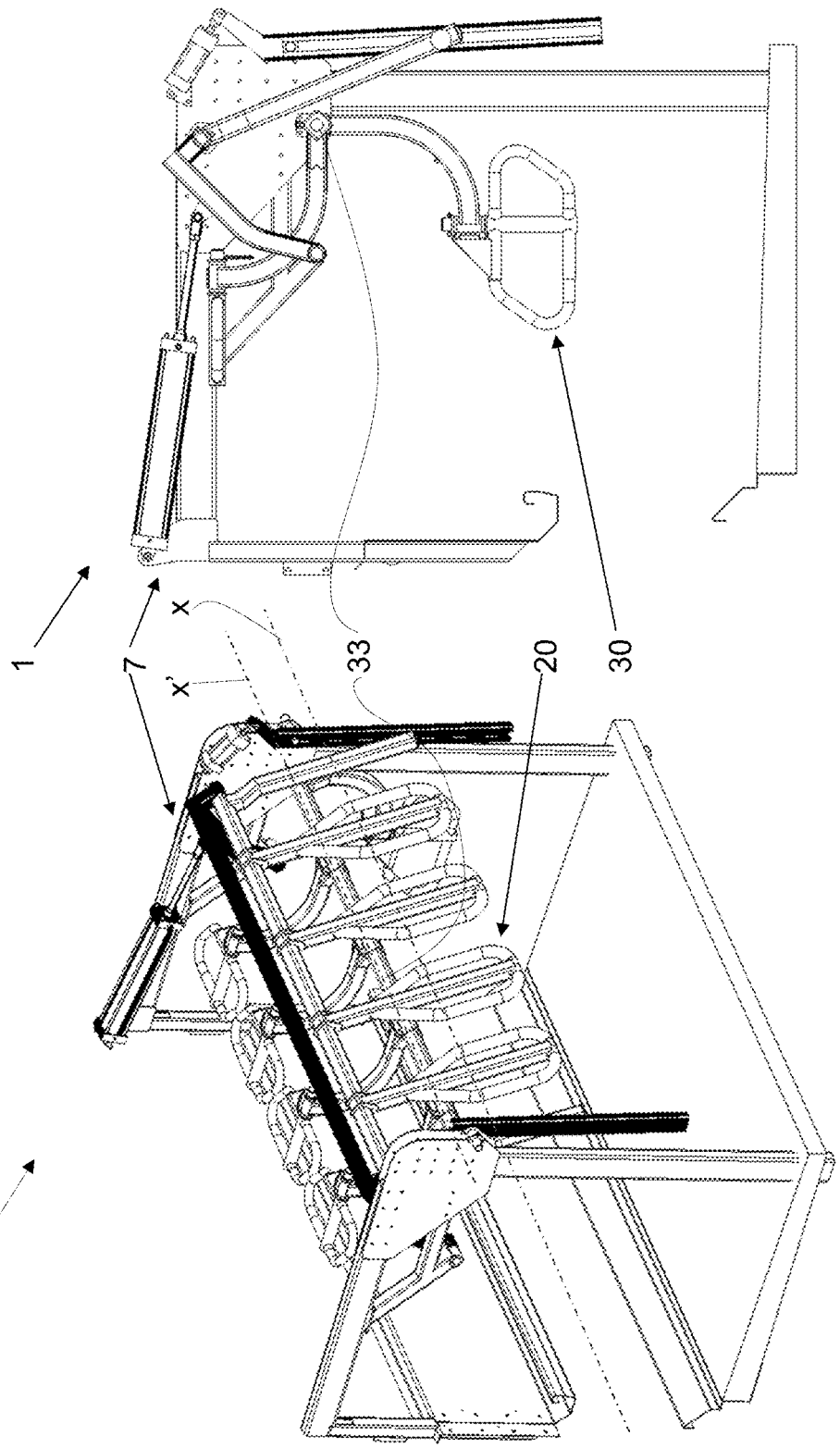

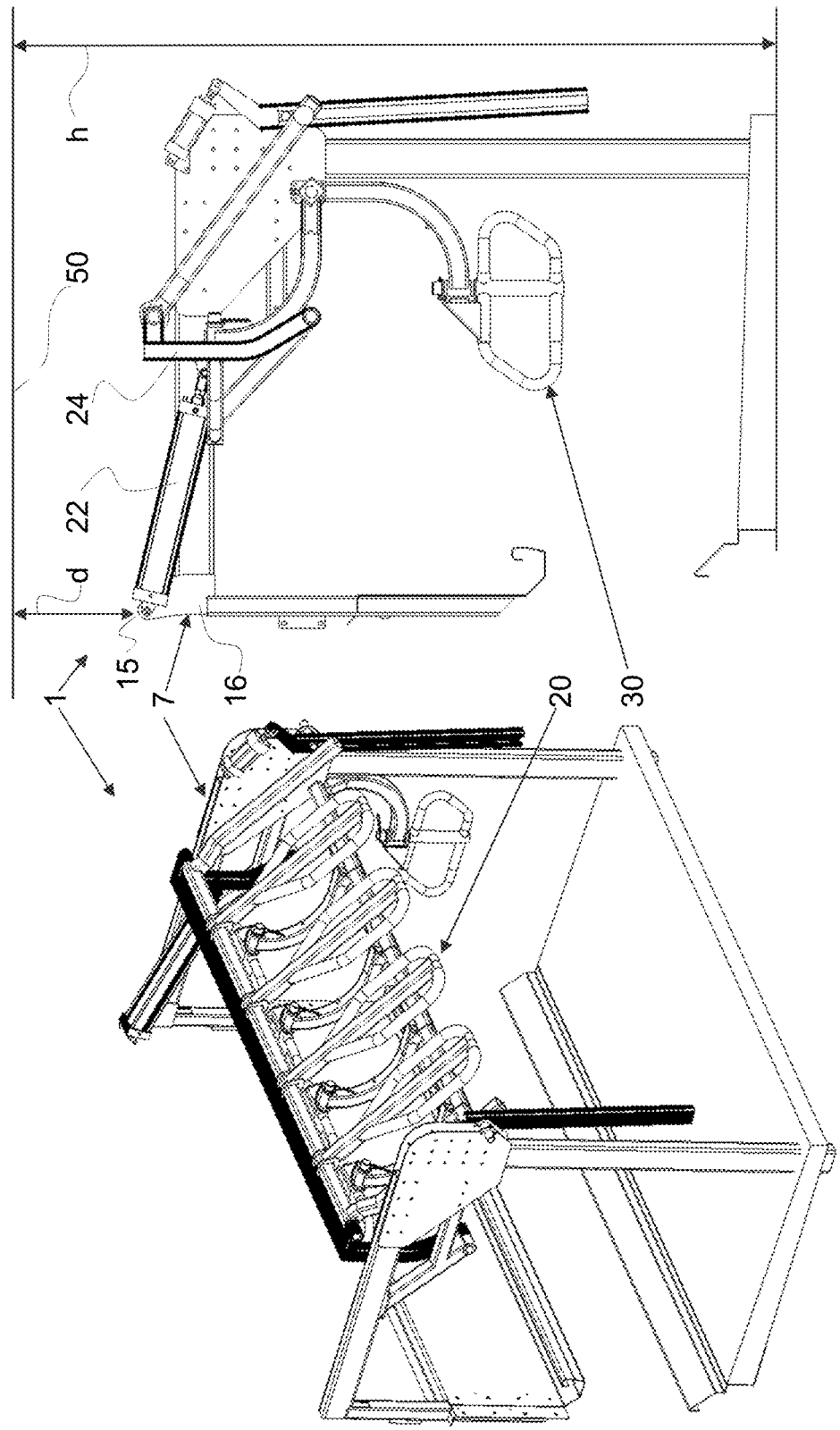

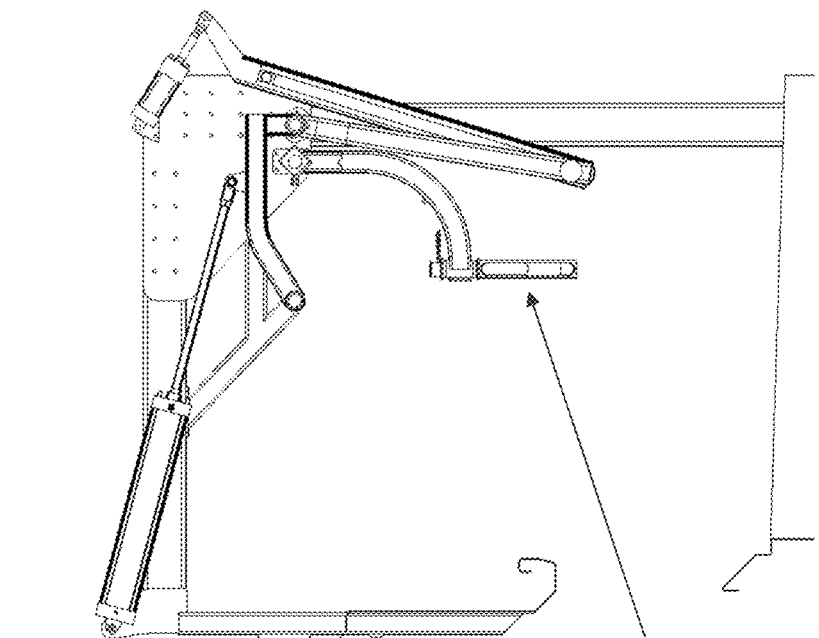
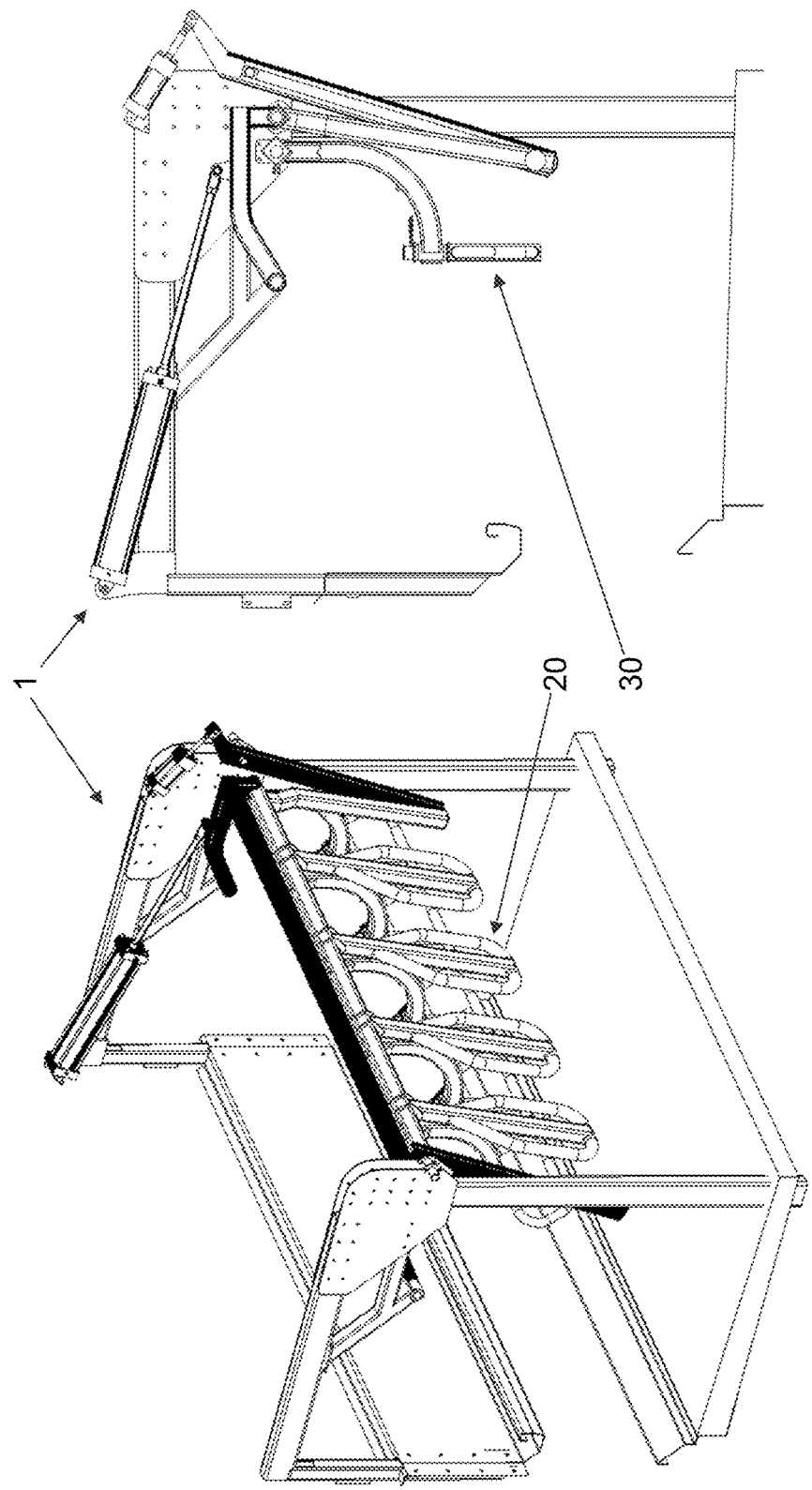

MILKING MODULE, A MILKING ARRANGEMENT, AND A METHOD FOR MILKING A GROUP OF ANIMALS

TECHNICAL FIELD OF THE INVENTION

The present invention refers to a milking module comprising at least two milking places arranged side by side after each other along a longitudinal axis, each milking place being configured to receive a respective animal to be milked,
a primary end and a secondary end opposite to the primary end, wherein the milking module extends along the longitudinal axis from the primary end to the secondary end,
a front side and a rear side, which both extend in parallel with the longitudinal axis,
a front gate assembly movable between a lower position, closing the front side to prevent the animals from leaving the respective milking place through the front side, and an upper position, configured to permit the animals to leave the respective milking place through the front side,
a further gate assembly being movable between a lower position and an upper position above the animals, and
a stationary support structure supporting the front gate assembly and the further gate assembly.

The present invention also refers to a milking arrangement comprising at least one milking module.

Furthermore, the present invention refers to a method for milking a group of at least two animals in a milking arrangement comprising
at least one milking module comprising at least two milking places arranged side by side after each other along a longitudinal axis, each milking place being configured to receive a respective one of the animals to be milked, and
a stationary support structure supporting a front gate assembly and a further gate assembly and defining an uppermost point of the milking module.

BACKGROUND AND PRIOR ART

U.S. Pat. No. 7,644,681 discloses a milking parlor comprising at least two milking places arranged side by side after each other along a longitudinal axis, each milking place being configured to receive a respective animal to be milked. The milking module extends along the longitudinal axis from the primary end to the secondary end. A front side and a rear side extend in parallel with the longitudinal axis. A front gate assembly is movable between a lower position, closing the front side to prevent the animals from leaving the respective milking place through the front side, and an upper position, configured to permit the animals to leave the respective milking place through the front side. A further gate assembly is movable between a lower position and an upper position above the animals. A stationary support structure supports the front gate assembly and the further gate assembly.

Limited space is a serious restriction when constructing milking parlors. In particular, the available height in many milking stall buildings having a low ceiling makes it difficult to house a complete milking parlor, especially a milking parlor having a front gate assembly, sometimes called neck rail, and further gate assemblies, such as a sequence gate assembly that can be raised vertically and/or a pushing bar of the kind disclosed in U.S. Pat. No. 7,644,681.

Furthermore, the construction of the milking parlor and the assembly of the very large number of parts are difficult tasks in the limited space available for the milking parlor.

Sequence gate assemblies are currently used in milking parlors to prevent animals from preloading into the milking places. These overlapping sequencing gates then close automatically after each animal exits the respective milking place. It is known to have the sequence gates secured to the platform i.e. a socket is casted into the concrete during construction. It is also known to have the sequence gates attached to the neck rail, which may be raised vertically to permit the animals to exit under the sequence gates and the neck rail.

SUMMARY OF THE INVENTION

The object of the present invention is to remedy the problems discussed above. In particular, the object is to provide a milking module adapted to be housed within a limited space.

The object is achieved by the milking module defined above, which is characterized in that the front gate assembly comprises a front gate and at least one guide bar, and that the front gate, by means of the at least one guide bar, movable along a curved path when the front gate assembly is moved between its lower position and its upper position.

Such a front gate assembly permits a compact design of the milking module. The front gate may remain within the milking module without projecting from the milking module when being in the upper position or the lower position. The at least one guide bar may guide the movement of the front gate along the curved path to be performed within a low ceiling clearance, especially within a lower ceiling clearance than required by a vertically movable front gate assembly.

According to an embodiment of the invention, the front gate assembly and the further gate assembly are located in the vicinity of each other when they are in their upper positions.

This emphasizes the compact design of the milking module. The front gate assembly and the further gate assembly may thus be located adjacent to each other above the milking space, and may thus permit the animals to pass beneath the gate assemblies.

According to an embodiment of the invention, the front gate is guided along the curved path by means of the at least one guide bar to permit an outer end of the front gate to move upwardly along the front side, and wherein an inner end of the front gate is moved towards the rear side.

According to an embodiment of the invention, the inner end of the front gate is located above the further gate assembly when the further gate assembly and the front gate assembly are in their upper positions.

According to an embodiment of the invention, the stationary support structure defines an uppermost point of the milking module and that the front gate assembly and the further gate assembly are located substantially below, or below, said uppermost point when being in their lower and upper positions and when being moved between their lower and upper positions.

Consequently, the uppermost point of the milking module will never be exceeded by any part of the milking module, especially not by the front gate assembly nor the further gate assembly. The milking module is therefore suitable for being installed and housed in a low milking stall building, especially a milking stall building having a low ceiling.

The milking module may be installed in the milking stall building as a prefabricated unit. All, or substantially all components, may be included in the milking module in advance, so that it is ready for being introduced into the milking stall building and being attached to the ground of the milking stall building.

Advantageously, the milking module may be arranged together with further milking modules in a milking stall building to form a milking arrangement with a very large number of milking places, preferably arranged after each other side by side along the longitudinal axis.

Furthermore, two rows of milking modules may be arranged, wherein the front gate assemblies may face a respective exit lane for the animals.

The milking module, or each milking module, may comprise at least two milking places and at the most six milking places, preferably at least three milking places and at the most five milking places.

According to an embodiment of the invention, the stationary support structure comprises an upper elongated element, extending transversely to the longitudinal axis between the rear side and the front side, and a front post, arranged at the front side and supporting the upper elongated element.

According to an embodiment of the invention, the uppermost point is located at a height of at the most 2.5 m above the ground of the milking module. The front gate assembly and the further gate assembly may be located below this height, or possibly at the most 0.2 m above the uppermost point.

According to an embodiment of the invention, the stationary support structure comprises a primary structural element defining the primary end, and a secondary structural element defining the secondary end, wherein the further gate assembly is supported by the primary structural element and the secondary structural element to be rotatable around an axis being parallel to the longitudinal axis. Such a rotatable movement of the further gate assembly may be performed within a low ceiling clearance, especially within a lower ceiling clearance than required by vertically movable sequence gates.

According to an embodiment of the invention, each of the primary structural element and the secondary structural element comprises an upper elongated element, extending transversely to the longitudinal axis between the rear side and the front side.

According to an embodiment of the invention, each of the primary structural element and the secondary structural element comprises a front post, arranged at the front side and supporting the upper elongated element.

According to an embodiment of the invention, at least one of the primary structural element and the secondary structural element comprises an opening configured to permit animals to pass through the primary structural element and/or the secondary structural element. For instance, the primary structural element may comprise an opening forming an entry for the animals entering the milking module. Also the secondary structural element may comprise an opening permitting an animal to exit the milking module, and to continue to an adjacent milking module.

According to an embodiment of the invention, the milking module comprises a drive arrangement for moving the front gate assembly and the further gate assembly between their lower and upper positions.

According to an embodiment of the invention, the drive arrangement is attached to the stationary support structure and located within the milking module between the primary end and the secondary end. The drive arrangement, may thus not protrude outwardly from the primary end and the secondary end. Thus, the milking modules may be arranged adjacent and closely to each other in the milking stall building.

Advantageously, the drive arrangement may be attached to one or both of the primary structural element and the secondary structural element.

According to an embodiment of the invention, the drive arrangement comprises a first drive member for the front gate assembly and a second drive member for the further gate assembly, wherein the milking module comprises a controller communicating with the first drive member and the second drive member for controlling the first drive member and the second drive member independently of each other. Advantageously, both the first drive member and the second drive member are attached to the stationary support structure and located within the milking module between the primary end and the secondary end.

According to an embodiment of the invention, the controller is configured to control the second drive member to move the further gate assembly from its lower position to its upper position after the animals have reached their respective milking place. During this movement of the further gate assembly, the front gate assembly may be in its lower position or an index position. By moving the further gate assembly to its upper position after the animals are loaded into their respective milking place, at least the larger animals will have more room because the space occupied by the further gate assembly is removed as the further gate assembly is moved to the upper position. Consequently, there will be more room in the milking module during the milking of the animals, so that the animals may be less rigidly confined at their respective milking place.

According to an embodiment of the invention, the controller is configured to control the second drive member to move the further gate assembly from its upper position to its lower position after the milking of the animals has been finished, in particular with a certain delay. During this movement of the further gate assembly, the front gate assembly is in its upper position.

According to an embodiment of the invention, the further gate assembly comprises at least two sequence gates, which are openable from a closing position, in which they extend in parallel with the longitudinal axis, to an opening position, in which they extend transversely to the longitudinal axis and give access to the respective milking place, wherein the sequence gates are in the closing position when the further gate assembly is in its upper position.

According to an embodiment of the invention, the inner end of the front gate is located above, and may overlap, the sequence gates when the front gate assembly and the further gate assembly are in their upper positions. Thus, when the front gate assembly and the further gate assembly are in their upper positions, the animals may pass beneath the sequence gates and the front gate, while the sequence gates and the front gate remain beneath the uppermost point.

According to an embodiment of the invention, the sequence gates are in the closing position when the further gate assembly is moved from its upper position to its lower position thereby exerting a pushing force on the animals in the respective milking place to leave the milking module through the front side. Thus, the further gate assembly may ensure that all animals leave the milking module promptly when the milking has been finished.

According to an embodiment of the invention, the further gate assembly is operable to permit the animals to enter sequentially their respective milking place, and operable to push the animals to leave their respective milking place when the milking has been finished.

According to an embodiment of the invention, the front gate assembly is movable beyond the lower position in a direction towards the rear side to an index position. Such an index position makes it possible to position the animal in an accurate position, which may be advantageous when the teatcups are to be attached to the animal.

The object defined above is also achieved by the milking arrangement comprising at least one milking module as defined above. Preferably, the milking arrangement comprises at least two or more milking modules arranged consecutively after each other along the longitudinal axis.

The object defined above is also achieved by the method initially defined and comprising the steps of:
  moving the front gate assembly from an upper position to a lower position closing a front side of the milking module to prevent the animals from leaving the respective milking place through the front side,
  moving the further gate assembly from an upper position to a lower position,
  leading the animals into the at least one milking module to a respective one of the milking places,
  milking the animals, and
  moving a front gate of the front gate assembly along a curved path to its upper position by means of at least one guide bar to permit the animals to leave the milking module.

Such an operation of the gate assemblies may be performed within a compact milking module. The front gate assembly may be movable from the upper position to the lower position and from the lower position to the upper position along the same curved path, but in opposite directions.

According to an embodiment of the invention, the method comprises the step of moving the further gate assembly from its lower position to its upper position after the animals have reached their respective milking place.

According to an embodiment of the invention, the method comprises the step of moving the further gate assembly from its upper position to its lower position after the milking of the animals has been finished, thereby exerting a pushing force on the animals in the respective milking place to leave the milking module through the front side.

According to an embodiment of the invention, wherein the further gate assembly comprises at least two sequence gates, which are openable from a closing position in which they extend in parallel with the longitudinal axis to an opening position in which they extend transversely to the longitudinal axis and give access to the respective milking place, the method comprising the step of holding the sequence gates in the closing position when the further gate assembly is in its upper position and when the further gate assembly is moved from its upper position to its lower position to exert said pushing force.

According to an embodiment of the invention, the method comprises the step of moving the front gate assembly beyond the lower position in a direction towards the rear side to an index position when the animals have reached their respective milking place in order to position the animals in an accurate position.

BRIEF DESCRIPTION OF THE DRAWINGS

The present invention is now to be explained more closely through a description of various embodiments and with reference to the drawings attached hereto.

FIG. 2A discloses a perspective view of a milking module of the milking arrangement in a load position.

FIG. 2B discloses a side view of the milking module in FIG. 2A.

FIG. 6A discloses a perspective view of the milking module with the front gate assembly further raised to 50%.

FIG. 6B discloses a side view of the milking module in FIG. 6A.

FIG. 8A discloses a perspective view of the milking module with the front gate assembly in an upper position, and a further gate assembly in an upper position.

FIG. 8B discloses a side view of the milking module in FIG. 8A.

FIG. 11A discloses a perspective view of the milking module with the front gate assembly in an index position.

FIG. 11B discloses a side view of the milking module in FIG. 11A.

DETAILED DESCRIPTION OF VARIOUS EMBODIMENTS OF THE INVENTION

Figure 1:
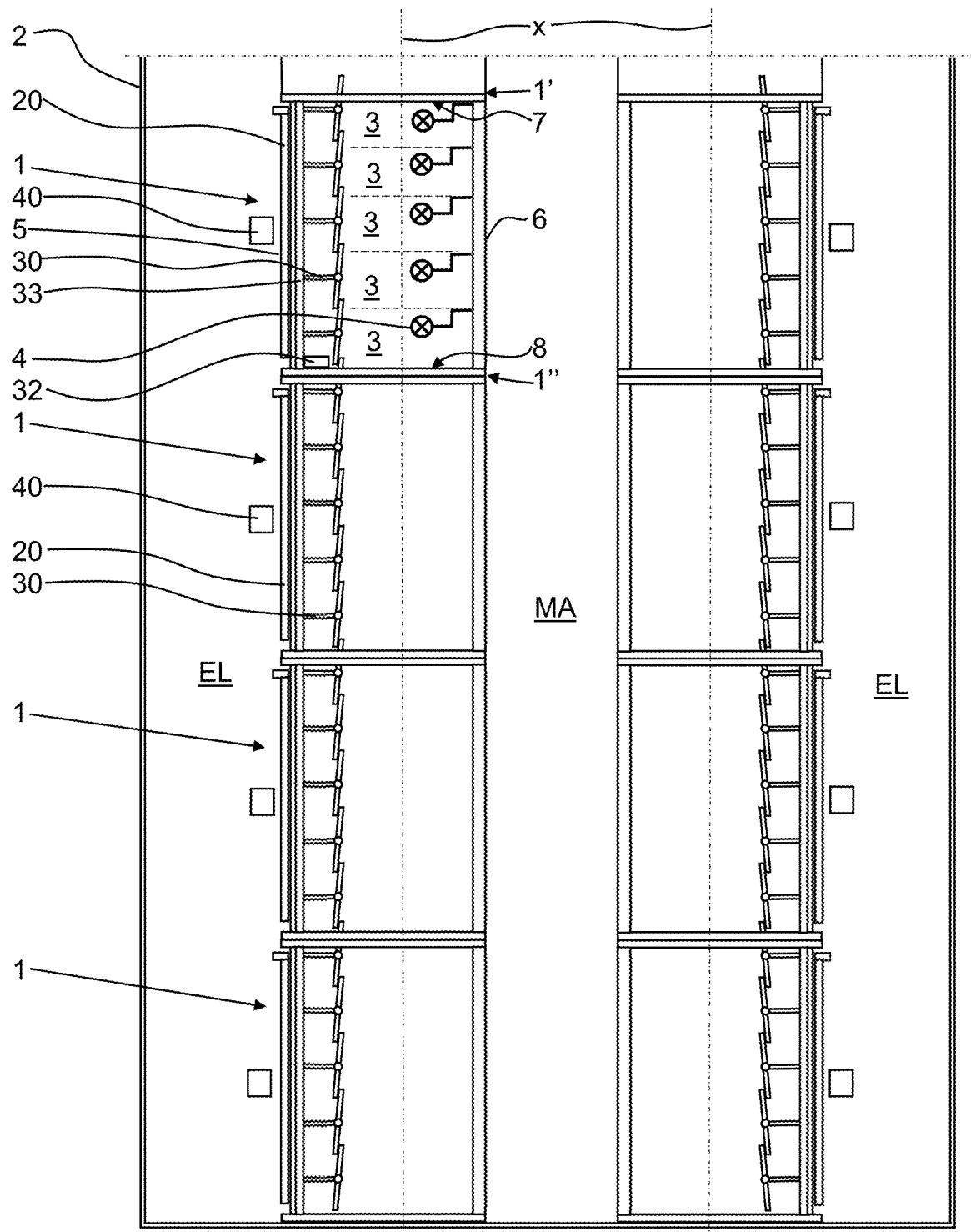
FIG. 1 discloses a view from above of a milking arrangement according to the invention.

FIG. 1 discloses a milking arrangement according to the invention. The milking arrangement comprises two rows of milking modules 1. In the embodiments disclosed, each row comprises four milking modules 1 which are arranged consecutively after each other along a respective longitudinal axis x. The milking arrangement is housed in a milking stall building 2.

With reference to FIGS. 2A-11B, the milking modules 1 will now be explained more closely. Each milking module 1 comprises five milking places 3 arranged side by side after each other along the longitudinal axis x, see FIG. 1. Each milking place 3 is configured to receive a respective animal to be milked with the aid of any suitable milking equipment 4, schematically indicated in FIG. 1 in one of the milking modules 1.

Each row may comprise another number of milking modules 1 than four. The milking arrangement may comprise another number of rows than two.

Each milking module 1 comprises a primary end 1' and a secondary end 1" opposite to the primary end 1'. The milking module 1 extends along the longitudinal axis x from the primary end 1' to the secondary end 1", wherein the longitudinal axis x extends through the primary end 1' and the secondary end 1".

Each milking module 1 also comprises a front side 5 and a rear side 6 which both extend in parallel with the longitudinal axis x. The primary end 1' forms the entry into the milking module 1 for the animals to be milked. When entering the milking module 1 the animals will walk into the milking module 1 and turn so that their head is located at the front side 5 and their rear end at the rear side 6. The milking equipment 4 is located in the proximity of the rear side as can be seen in FIG. 1.

In the milking arrangement, see FIG. 1, the rear side 6 of each milking module 1 is facing a central milker area MA, in which the milker may be present for attaching teatcups of the milking equipment 4 to the teats of the animals. Outside the respective row of milking modules 1 an exit lane EL is provided to permit the animals to leave.

Each milking module 1 also comprises a stationary support structure comprising a primary structural element 7 defining the primary end 1' and a secondary structural element 8 defining the secondary end 1", see FIGS. 2A and 2B.

Each of the primary structural element 7 and the secondary structural element 8 comprises an upper elongated element 9. The upper elongated elements 9 extend transversally to the longitudinal axis x between the rear side 6 and the front side 5.

Each of the primary structural element 7 and the secondary structural element 8 also comprises a front post 10. The front posts 10 extend vertically at the front side 5. The front posts 10 support a respective one of the upper elongated elements 9. The upper elongated element 9 and the front post 10 are connected to each other by means of a corner member 11.

At the rear side 6, a rear shield 12 is provided. The rear shield 12 is suspended from the upper elongated elements 9 by two vertical bars 13, one from each of the upper elongated elements 9.

In the embodiments disclosed the primary structural element 7 defines an uppermost point 15 of the milking module 1, see FIGS. 2B and 8B. The uppermost point 15 is formed by a support plate 16 comprised by the primary structural element 7.

The support plate 16 may, as disclosed in FIGS. 2A and 8B, be attached to a rear end of the elongated element 9.

The primary structural element 7 also comprises a further support plate 17, which may be attached to the upper elongated element 9 at a front end thereof, see FIG. 2B.

The support plate 16 and/or the further support plate 17 may alternatively be attached to the secondary structural element 8.

The milking module 1 is attached to the ground as can be seen in FIGS. 2A-11B. The attachment of the milking module 1 is achieved by fixing the front posts 10 in the ground. The ground, or floor, is in the embodiments disclosed not a part of the milking module 1. However, it is possible to let the ground, possibly formed by a floor plate, be a part of the milking module 1.

The milking module 1, with or without a floor plate, may be installed in the milking stall building 2 as a prefabricated unit. The milking module 1 may thus be moved into the milking stall building 2 as a unit and arranged in its proper position.

Each milking module 1 also comprises a front gate assembly 20 and a further gate assembly 30.

The front gate assembly 20 is provided at the front side 5 and extends in parallel with the longitudinal axis x. The front gate assembly 20 is movable between a lower position, see FIGS. 2A and 2B, and an upper position, see FIGS. 8A, 8B, 9A and 9B. In the lower position, the front gate assembly 20 closes the front side 5 to prevent the animals from leaving the respective milking place 3 through the front side 5. In the upper position, the front gate assembly 20 permits the animals to leave the respective milking place 3 through the front side 5.

The further gate assembly 30 is movable between a lower position, see FIGS. 2A, 2B and 9A-11B, and an upper position, see FIGS. 3A-8B.

Both the front gate assembly 20 and the further gate assembly 30 are supported by the stationary support structure, and more precisely by the primary structural element 7 and the secondary structural element 8.

The further gate assembly 30 comprises five sequence gates 31, which are openable from a closing position, see FIGS. 2A and 2B, in which they extend in parallel with the longitudinal axis x to an opening position in which they extend transversally to a longitudinal axis x and give access to the respective milking place 3.

The sequence gates 31 are brought to the opening position by the animals when they enter the respective milking place 3. The animals entering the milking module 1 will proceed as far as possible and then turn into the last free milking place 3 and thereby opening the respective sequence gate 31 in a manner known per se.

Figure 3B:
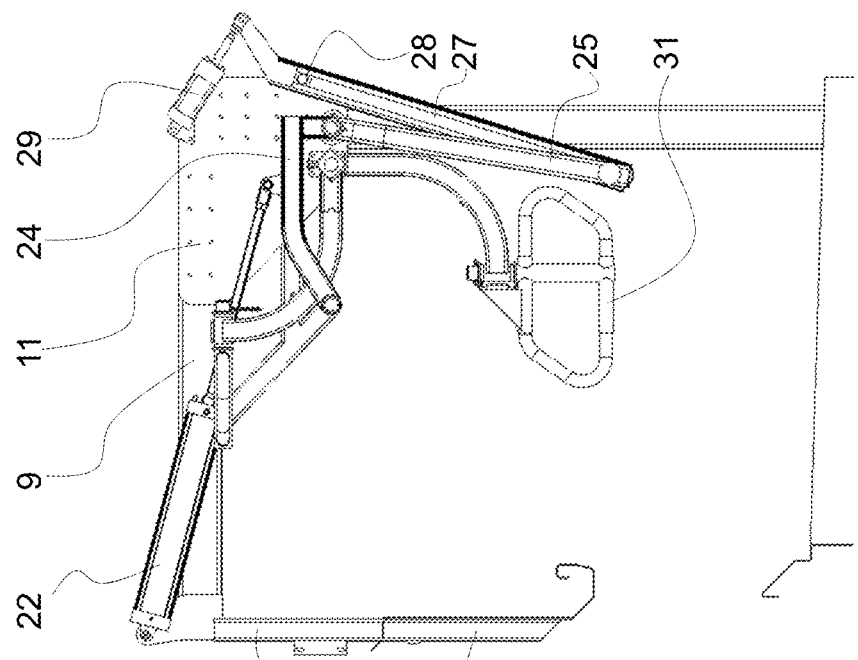
FIG. 3B discloses a side view of the milking module in FIG. 3A.
Figure 3A:
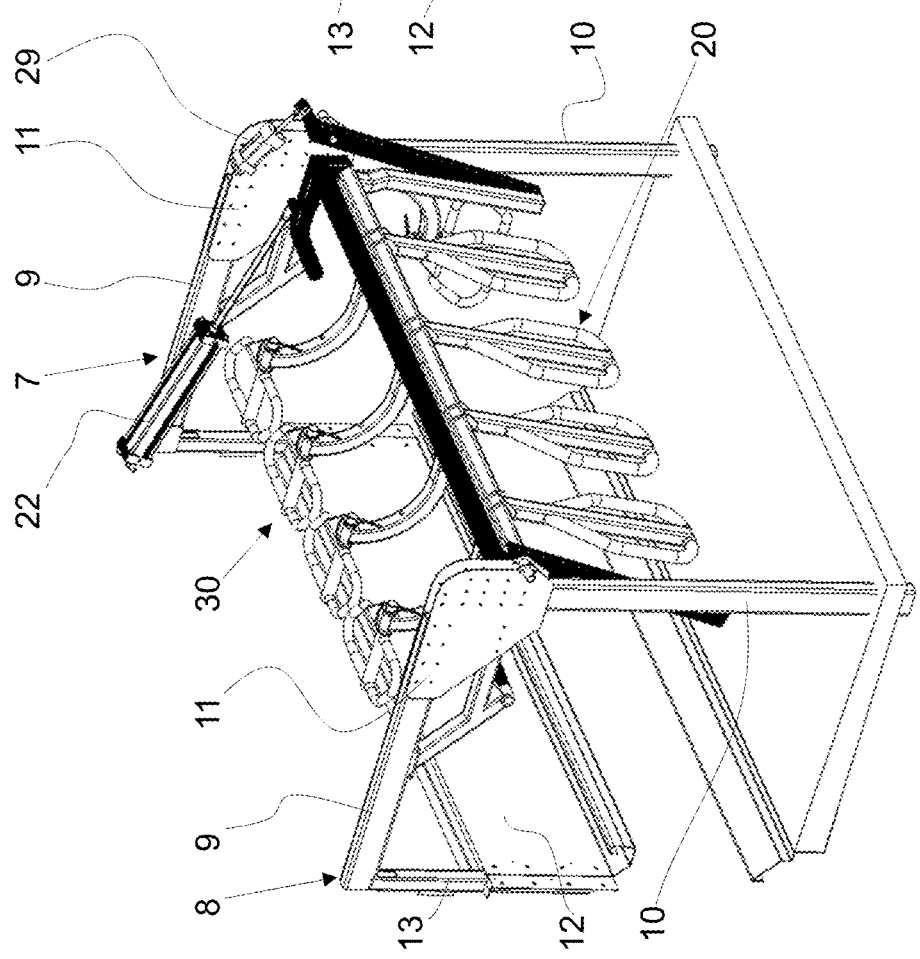
FIG. 3A discloses a perspective view of the milking module in a milking position.

The sequence gates 31 are in the closing position when the further gate assembly 30 is in its upper position as can be seen in for instance FIGS. 3A and 3B.

In the embodiments disclosed, only four of the five sequence gates 31 are movable from the lower position to the upper position and from the upper position to the lower position. The first sequence gate 31 being closest to the primary end 1', see FIGS. 3A and 3B, will remain in the lower position also when the four next sequence gates 31 are moved to the upper position. The first sequence gate 31 will thus function as a primary gate at the primary end 1' of the respective milking module 1, and form a kind of border between the milking modules 1 in the row of milking modules 1 in the milking arrangement during milking of the animals.

The further gate assembly 30 is supported by the primary structural element 7 and the secondary structural element 8 to be rotatable around an axis x' which is parallel to the longitudinal axis x, see FIG. 6A. As can be seen, in for instance FIGS. 6A and 6B, the further gate assembly 30 is rotatably supported by the corner members 11 of the primary structural element 7 and the secondary structural element 8.

The front gate assembly 20 comprises a front gate 21, forming a so-called neck rail and having four bottle-shaped elements. The front gate 21 of the front gate assembly 20 prevents the animals from passing the front gate 21 when the front gate assembly 20 is in the lower position, but permits, in this position, the animals to extend their heads through the front gate 21, in particularly between the bottle-shaped elements, for instance for eating feed provided in front of and outside the front gate assembly 20.

The front gate 21 is movable along a curved path when the front gate assembly 20 is moved between the lower position and the upper position. The front gate assembly 20 is also movable beyond the lower position in a direction towards the rear side 6 to an index position, see FIGS. 3A, 3B, 11A and 11B.

Each milking module 1 also comprises a drive arrangement for moving the front gate assembly 20 and the further gate assembly 30 between their lower and upper positions.

The drive arrangement is attached to the stationary support structure and located within the milking module 1 between the primary end 1' and the secondary end 1".

The drive arrangement comprises a first drive member 22 for moving the front gate assembly 20, see FIGS. 3A and 3B, and a second drive member 32 for moving the further gate assembly 30.

The milking module 1 is associated with a controller 40 communicating with the first drive member 22 and the second drive member 32 for controlling the first drive member 22 and the second drive member 32 independently of each other.

The first drive member 22 is comprised by the front gate assembly 20. The second drive member 32 is comprised by the further gate assembly 30.

The second drive member 32 may be attached to the secondary structural element 8 as is schematically indicated in FIG. 1. It is of course also possible to attach the second drive member 32 to the primary structural element 7.

The front gate assembly 20 comprises a shaft 23 to which the front gate 21, with the four bottle shaped elements, is attached, see FIGS. 2A and 2B. The shaft 23 is rotatably held by two levers 24, one at the primary end 1' and one at the secondary end 1". The two levers 24 are rotatably held at a rear end of the levers 24 in the primary structural element 7 and the secondary structural element 8, respectively, by means of a respective joint.

The front gate assembly 20 also comprises two arms 25 both attached to the shaft 23. The arms 25 has at an outer end opposite to the shaft 23, a guide wheel which is slidable in a guide channel of a respective guide bar 27.

In the embodiments disclosed, the front gate assembly 20 comprises two arms 25 and two guide bars 27. However, it is possible to provide only one arm 25 and one guide bar 27.

The first drive member 22 comprises a cylinder and is connected to the lever 24 to move the lever 24 from a lower position, see FIG. 3B, in which the first drive member 22 is extended, to an upper position, see FIG. 8B, in which the first drive member 22 is retracted. When being moved from the lower position to the upper position, the lever 24 retracts the arm 25 so that it will slide from a lower point in the guide channel of the guide bar 27 to an upper point of the guide channel. This will permit the front gate assembly 20 to be moved from the lower position disclosed in FIGS. 4A, 4B to the upper position disclosed in FIGS. 8A, 8B along the curved path via the intermediate positions disclosed in FIGS. 5A-7B.

The front gate 21 has an inner end which is located at the shaft 23 and outer end. The front gate 21 is guided along the curved path by means of the guide bars 27 so that the outer end of the front gate 21 moves upwardly along the front side, i.e. substantially in parallel with the front side 5, as can be seen in FIGS. 4B, 5B, 6B, 7B and 8B. The inner end of the front gate 21 is simultaneously moved or pulled towards the rear side 6.

As mentioned above, the front gate assembly 20 is movable beyond the lower position to an index position shown in FIGS. 3A, 3B, 11A and 11B. This movement is obtained by means of the guide bars 27.

The guide bars 27 are attached to a respective one of the primary structural element 7 and the secondary structural element 8 by means of a respective joint 28. The joints 28 permit the guide bars 27 to rotate around the respective joint 28. The rotation of the guide bars 27 is provided by means of an index drive member 29 attached to the corner member 11 of the primary structural element 7 as can be seen in FIGS. 2A-3B. The index drive member 29 is connected to an extension of the guide bar 27 attached to the primary structural element 7. The index drive member 29 comprises a cylinder.

In FIGS. 2A and 2B, the index drive member 29 is retracted and the guide bar 27 are in a first position holding the front gate assembly 20 in its lower position. The first position is vertical, or substantially vertical.

In FIGS. 3A and 3B, the index drive member 29 is extended and has moved the guide bar 27 from the first position to a second position, thereby moving the front gate assembly 20 from the lower position to the index position.

As mentioned above, the further gate assembly 30 is movable by means of the second drive member 32. The further gate assembly 30 comprises a shaft 33 which is rotatable in relation to the primary structural element 7 and the secondary structural element 8, see FIGS. 4A-8B.

The first sequence gate 31 of the further gate assembly 30 is fixedly attached to the primary structural element 7. The four next sequence gates 31 are fixedly attached to the shaft 33 to be rotatable between the lower position and the upper position of the further gate assembly 30 and the four sequence gates 31. The second drive member 32 is connected to the shaft 33 to provide said rotation of the further gate assembly 30.

As mentioned above, the front gate assembly 20 and the further gate assembly 30 will always be positioned below the uppermost point. In FIGS. 8A and 8B, the front gate assembly 20 and the further gate assembly 30 are shown in their upper positions, and it can be seen that they do not exceed the uppermost point 15 and are located below the ceiling 50 of the milking stall building 2. The distance h between the ground of the milking stall building 2 and the ceiling 50 is less than 3.5 m, preferably less than 3 m, more preferably less than 2.5 m. The uppermost point 15 may thus be located at a small distance d from the ceiling 50, see FIG. 8B.

As can also be seen in FIG. 8B, the inner end of the front gate 21 is located above and overlaps the sequence gates 31, when the front gate assembly 20 and the further gate assembly 30 are in their upper positions in the vicinity of each other, so that the animals may pass beneath the sequence gates 31 and the front gate 21, while the sequence gates 31 and the front gate 21 remain beneath the uppermost point 15.

The milking arrangement, and the individual milking modules 1 will be operated as follows.

Initially, the front gate assembly 20 and the further gate assembly 30 are moved from the positions disclosed in FIGS. 11A, and 11B to their respective lower positions disclosed in FIGS. 2A and 2B by activation of the index drive member 29 and the second drive member 32 through the controller 40. The animals are then allowed to enter the milking modules 1 through the primary structural element 7, wherein the sequence gates 31 are in the closing positions. The first animal entering the milking modules 1 will continue to the last milking place 3 of the last milking module 1, and there turn into the milking place 3, thereby opening the respective sequence gate 31. The following animals will then sequentially enter the milking places 3 until all milking modules 1 have been filled by the animals.

As soon as one milking module 1 is complete, the front gate assembly 20 is moved to the index position disclosed in FIGS. 3A and 3B by activation of the index drive member 29 through the controller 40. The teatcups of the milking equipment 4 are then attached to the teats of the animals, whereafter the milking is started.

The further gate assembly 30 is then moved to its upper position, see FIGS. 3A and 3B, by activation of the second drive member 32 through the controller 40, wherein the four last sequence gates 31 are lifted to the upper position and the first sequence gate 31 remains in its lower position. When the milking has been finished and the teatcups are removed from the teats of the animals in one milking module 1, the front gate assembly 20 is moved from the index position to the lower position as disclosed in FIGS. 4A and 4B, by activation of the index drive member 29 through the controller 40.

Figure 4B:
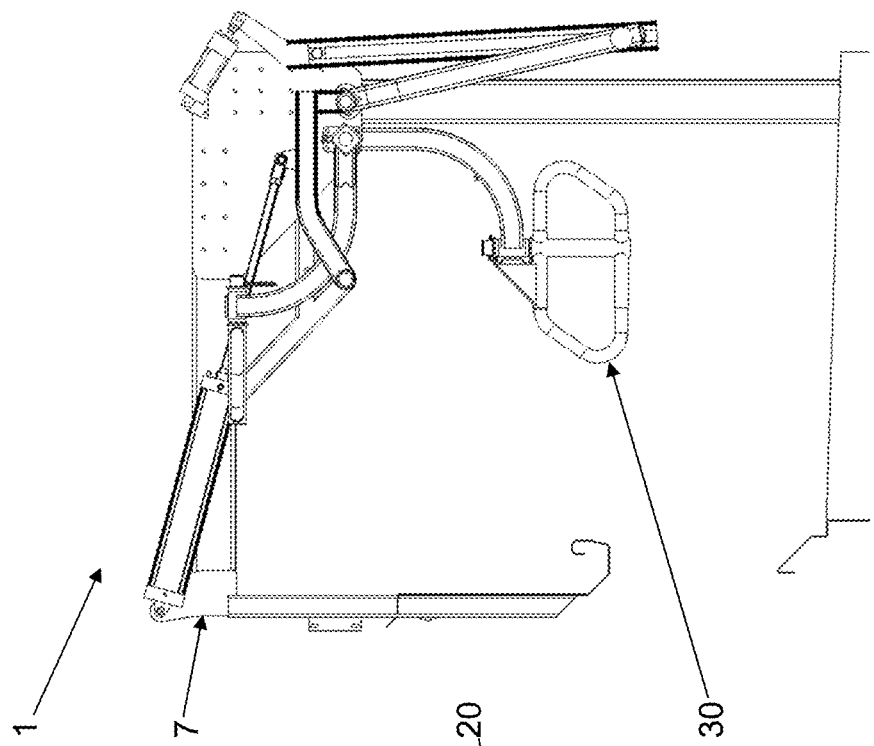
FIG. 4B discloses a side view of the milking module in FIG. 4A.
Figure 4A:
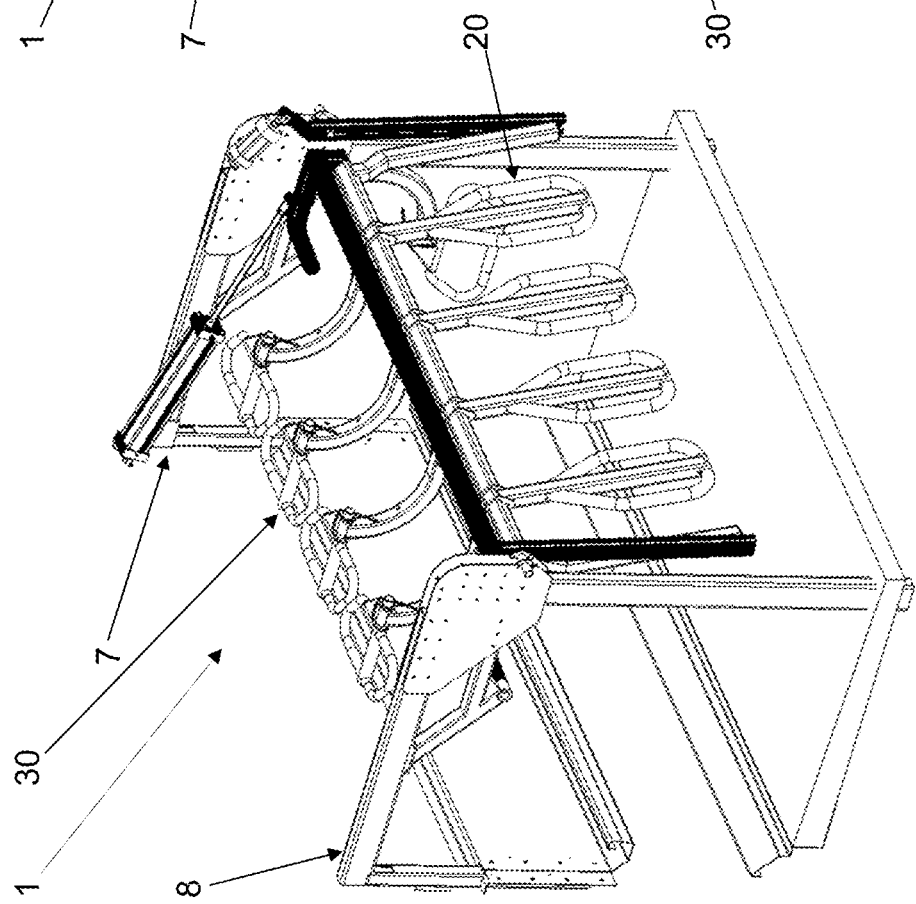
FIG. 4A discloses a perspective view of the milking module with an initially raised further gate assembly.
Figure 5B:
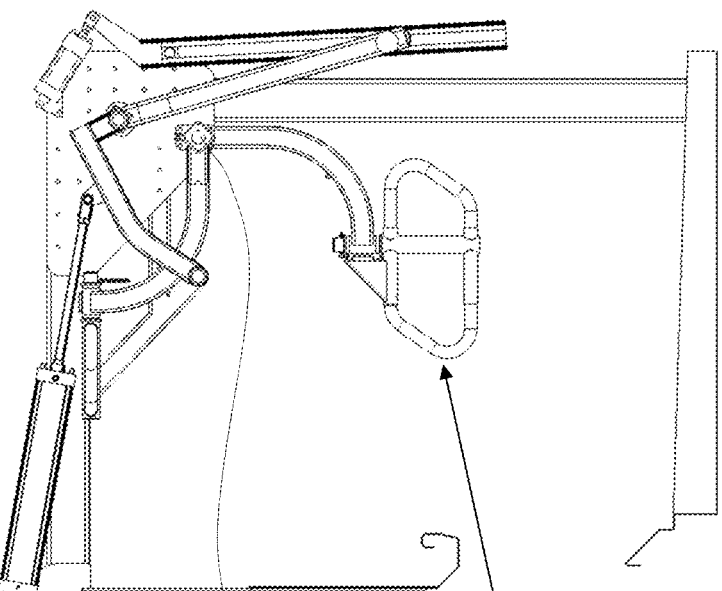
FIG. 5B discloses a side view of the milking module in FIG. 5A.
Figure 5A:
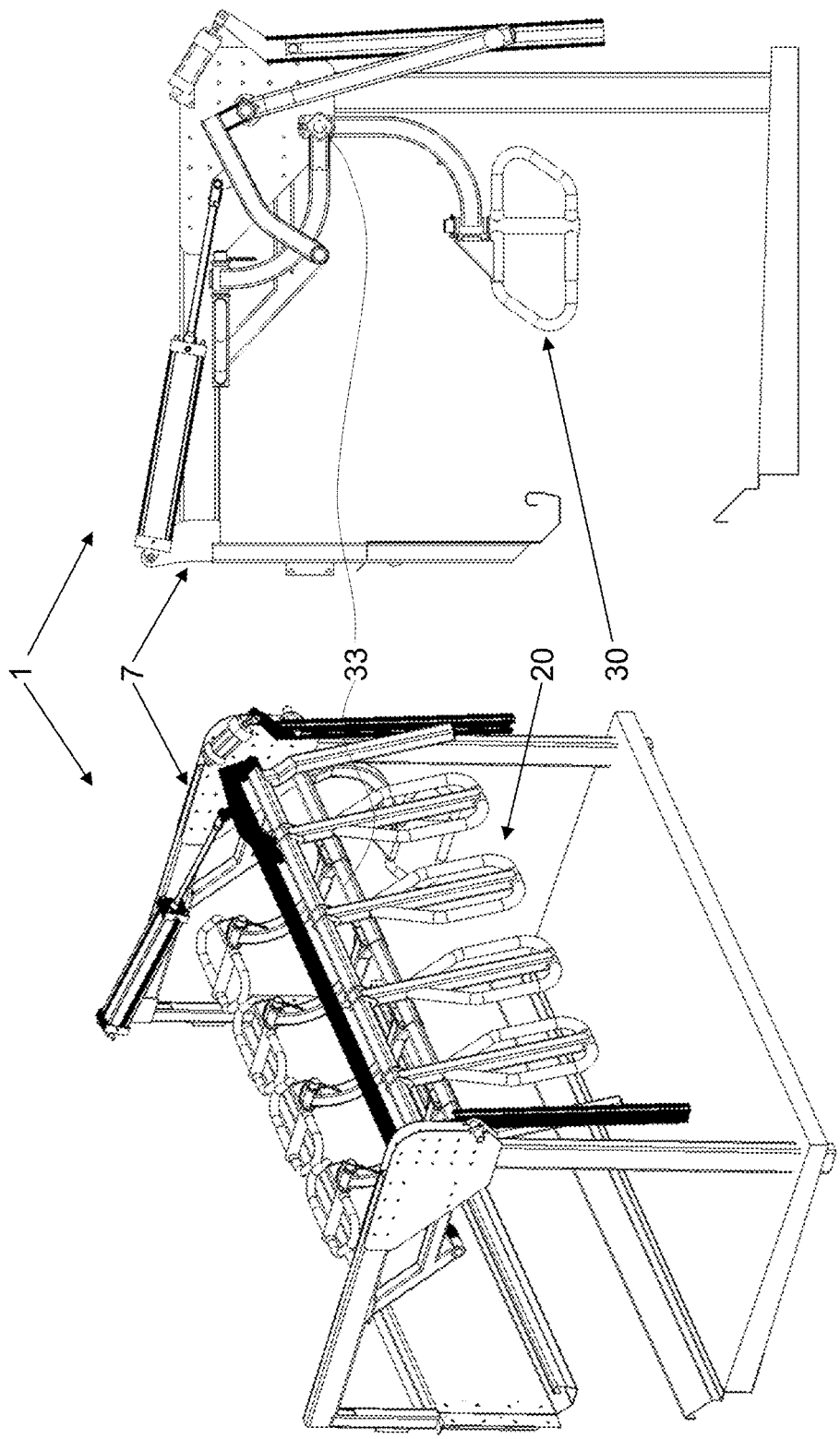
FIG. 5A discloses a perspective view of the milking module with the front gate assembly further raised 25%.
Figure 7B:
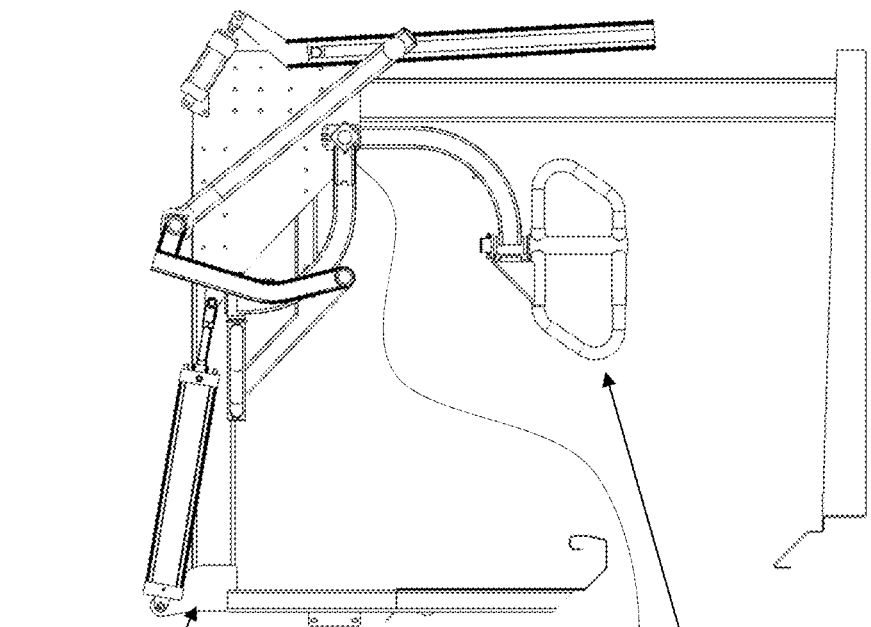
FIG. 7B discloses a side view of the milking module in FIG. 7A.
Figure 7A:
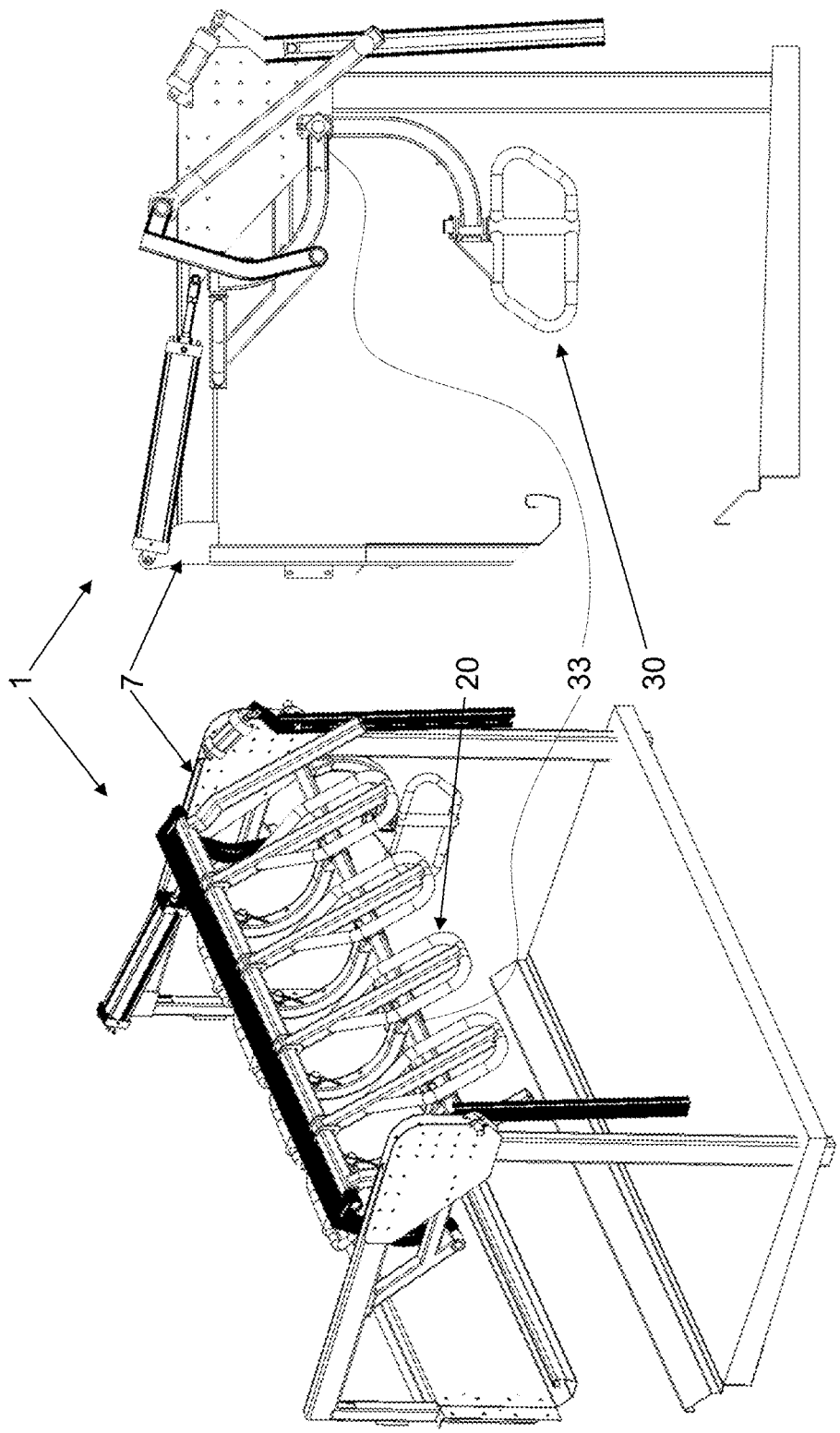
FIG. 7A discloses a perspective view of the milking module with the front gate assembly further raised to 75%.

The front gate assembly 20 is then moved from the lower position disclosed in FIGS. 4A and 4B to the upper position disclosed in FIGS. 8A and 8B along the curved path via the intermediate positions disclosed in FIGS. 5A-7B by activation of the first drive member 22 through the controller 40. During the movement of the front gate assembly 20, the further gate assembly 30 remains in the upper position.

Figure 9B:
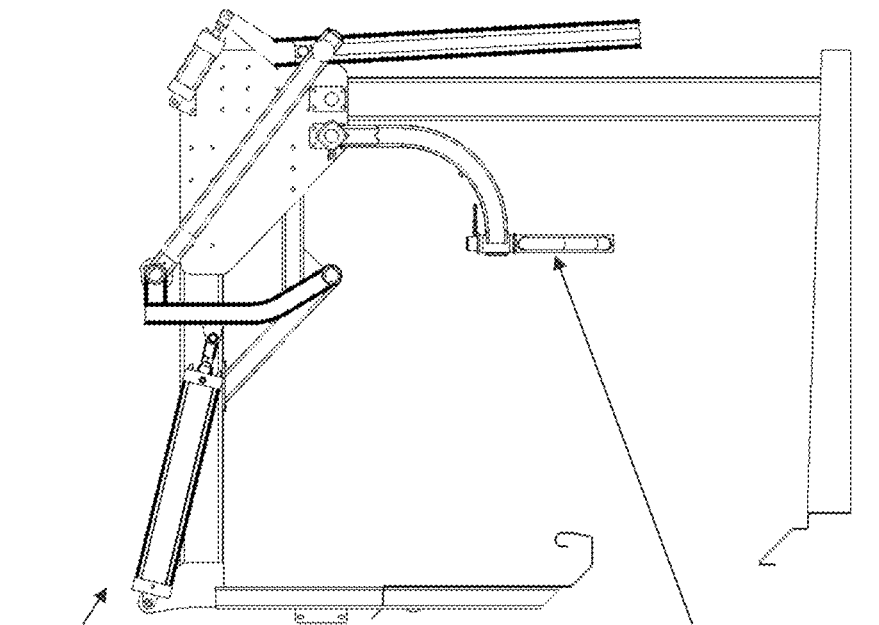
FIG. 9B discloses a side view of the milking module in FIG. 9A.
Figure 9A:
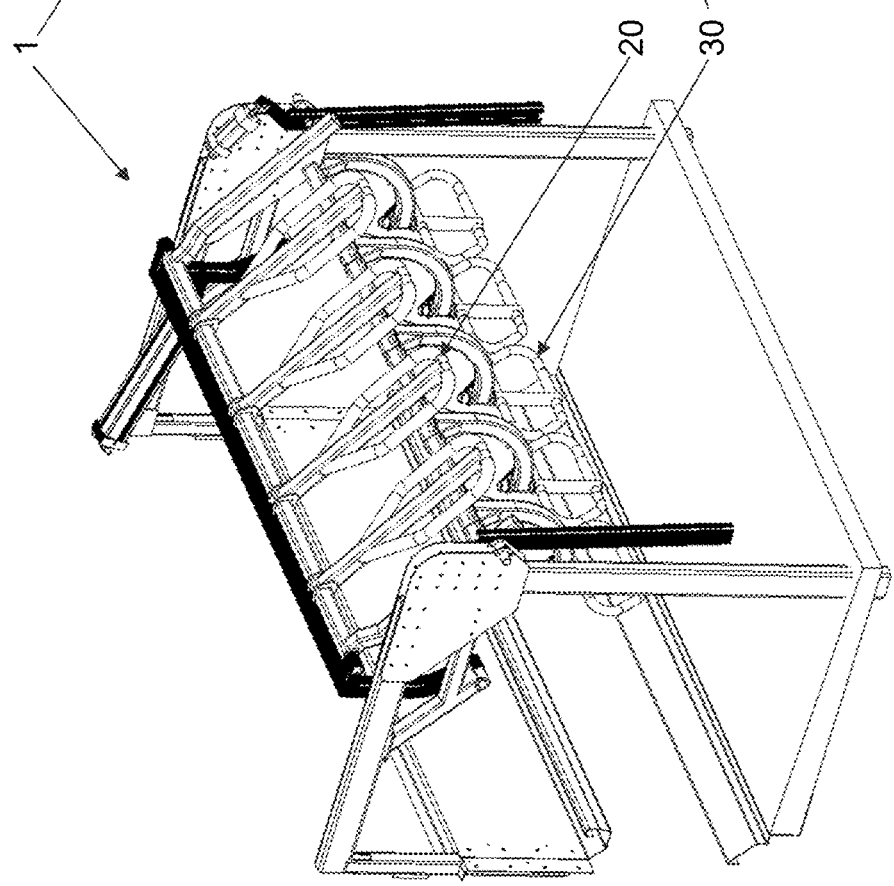
FIG. 9A discloses a perspective view of the milking module with a further gate assembly in a lower position.
Figure 10B:
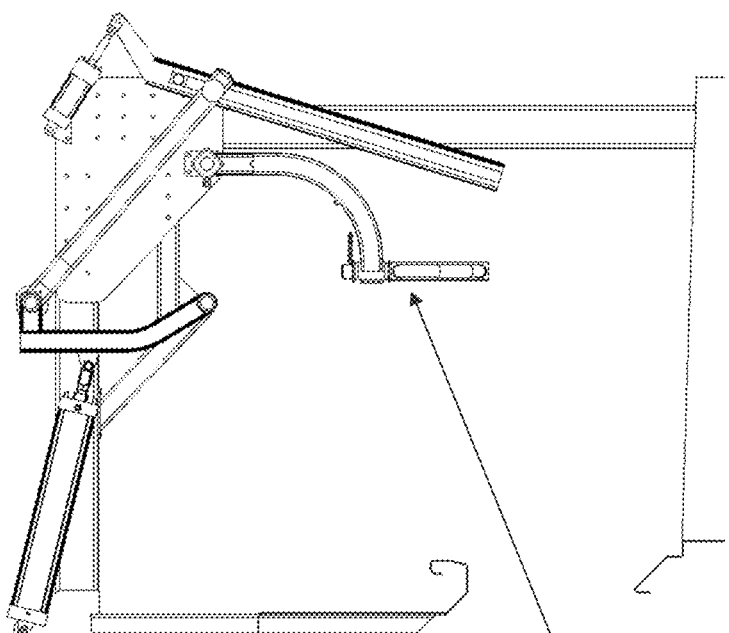
FIG. 10B discloses a side view of the milking module in FIG. 10A.
Figure 10A:
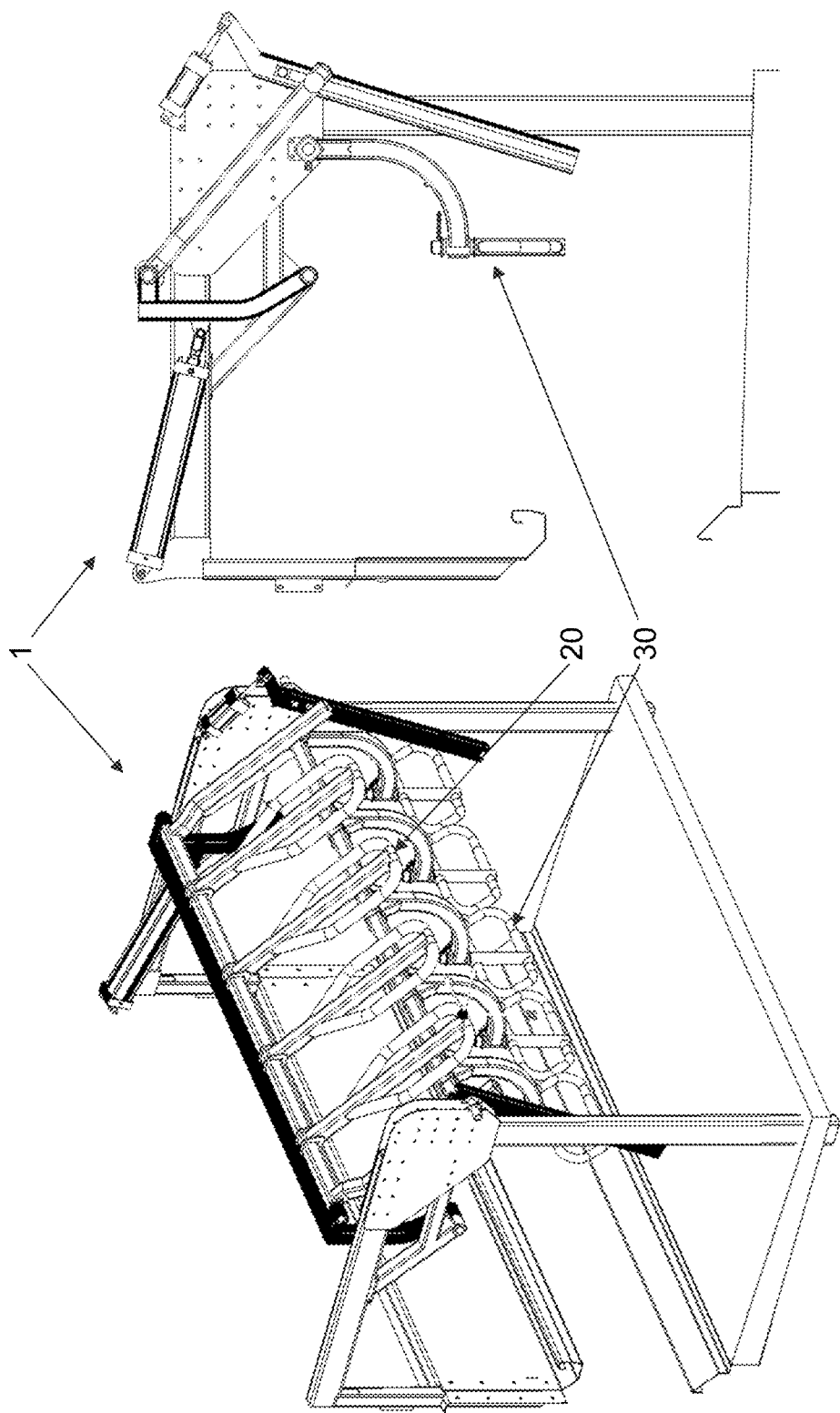
FIG. 10A discloses a perspective view of the milking module with the front gate assembly prepared for being lowered.

Then, or when the animals have started to walk out of the milking module through the front side 5, the further gate assembly 30 is moved from the upper position disclosed in FIGS. 8A-8B to the lower position disclosed in FIGS. 9A and 9B, by activation of the second drive member 32 through the controller 40. The further gate assembly 30 will then push animals, which have not yet left their respective milking place 3, forward out through the milking module 1 through the front side 5.

The animals may then leave the milking arrangement via the exit lanes EL. The guide bars 27 are then moved to the index position, see FIGS. 10A and 10B and the front gate assembly is then moved from the upper position directly to the index position as disclosed in FIGS. 11A and 11B.

The present invention is not limited to the embodiments disclosed but may be varied and modified within the scope of the following claims.

The invention claimed is:

1. A milking module (1), comprising:
a primary end (1') and a secondary end (1") opposite to the primary end (1'), the milking module (1) extending along a longitudinal axis (x) from the primary end (1') to the secondary end (1");
at least two milking places (3) arranged side by side after each other along the longitudinal axis (x), each milking place (3) being configured to receive a respective animal to be milked;
a front side (5), and a rear side (6) opposite the front side (5), both the front side and the rear side extending in directions parallel with the longitudinal axis (x);
a front gate assembly (20) movable between a lower closed position that closes the front side (5) to prevent the animals from leaving the milking places (3) through the front side (5), and an upper open position that permits the animals to leave the milking places (3) through the front side (5);
a further gate assembly (30), movable between a lower position and an upper position above the animals; and
a stationary support structure supporting the front gate assembly (20) and the further gate assembly (30),
wherein the front gate assembly (20) comprises a shaft (23), a front gate (21) attached to the shaft (23), and at least one guide bar (27), the front gate (21) having an inner end located at the shaft (23) and an outer end opposite the inner end,
wherein the front gate (21), by means of the at least one guide bar (27), is guided along a curved path by means of the at least one guide bar (27) when the front gate assembly (20) is moved between the lower closed position and the upper open position, such that the outer end of the front gate (21) is caused to move upwardly in a direction along the front side (5) while, simultaneously, the inner end of the front gate (21) is caused to move upwardly and away from the front side (5) toward the rear side (6),
wherein the further gate assembly (30) comprises at least two sequence gates (31),
said sequence gates being openable from a closing position, in which the sequence gates extend along a direction parallel with the longitudinal axis (x), to an opening position, in which said at least two sequence gates (31) each extend transversely to the longitudinal axis (x) to permit access to a respective milking place (3), and
wherein the sequence gates (31) are in the closing position when the further gate assembly (30) is in the upper position.

2. The milking module (1) according to claim 1,
wherein the outer end of the front gate (21), guided along the curved path by means of the at least one guide bar (27), moves upwardly substantially in parallel with the front side (5) while the inner end of the front gate (21) moves towards the rear side (6).

3. The milking module (1) according to claim 1,
wherein the stationary support structure defines an uppermost point (15) of the milking module (1), and
wherein the front gate assembly (20) is located substantially below said uppermost point (15) when in the lower closed position, when in the upper open position, and when being moved between the lower closed position and the upper open position, and
wherein the further gate assembly (30) is located substantially below said uppermost point (15) when in the upper position, when in the lower position, and when being moved between lower position and the upper position.

4. The milking module (1) according to claim 1, wherein the stationary support structure comprises an upper elongated element (9), extending transversely to the longitudinal axis (x) between the rear side (6) and the front side (5), and a front post (10) arranged at the front side (5) and supporting the upper elongated element (9).

5. The milking module (1) according to claim 1,
wherein the stationary support structure defines an uppermost point (15) of the milking module (1),
wherein the uppermost point (15) is located at a height of at most 2.5 m above the ground of the milking module (1), and
wherein the front gate assembly (20) and the further gate assembly (30) are located at most 0.2 m above the uppermost point (15).

6. The milking module (1) according to claim 1,
wherein the stationary support structure comprises a primary structural element (7) defining the primary end (1'), and a secondary structural element (8) defining the secondary end (1"), and
wherein the further gate assembly (30) is supported by the primary structural element (7) and the secondary structural element (8) to be rotatable around an axis (x') that is parallel to the longitudinal axis (x).

7. The milking module (1) according to claim 1, further comprising:
a drive arrangement for moving the front gate assembly (20) and the further gate assembly (30) between their lower and upper positions.

8. The milking module (1) according to claim 7, wherein the drive arrangement is attached to the stationary support structure and located within the milking module (1) between the primary end (1') and the secondary end (1").

9. The milking module (1) according to claim 7,
wherein the drive arrangement comprises a first drive member (22) for the front gate assembly (20), and a second drive member (32) for the further gate assembly (31), and
wherein the milking module (1) is associated with a controller (40) in communication with the first drive member (22) and the second drive member (32) for controlling the first drive member (22) and the second drive member (32) independently of each other.

10. The milking module (1) according to claim 9, wherein the controller (40) is configured to control the second drive member (32) to move the further gate assembly (30) from the lower position to the upper position after the animals have reached the milking places (3).

11. The milking module (1) according to claim 10, wherein the controller (40) is configured to control the second drive member (32) to move the further gate assembly (30) from the upper position to the lower position after the milking of the animals has finished.

12. The milking module (1) according to claim 1, wherein the inner end of the front gate (21) is located above the sequence gates (31) when the front gate assembly (20) is in the upper open position and the further gate assembly (30) is in the upper position.

13. The milking module (1) according to claim 1, wherein the sequence gates (31) are in the closing position when the further gate assembly (30) is moved from the upper position to the lower position for exerting a pushing force on the animals in the milking places (3) and thereby urging the animals to leave the milking module (1) through the front side (5).

14. The milking module (1) according to claim 1, wherein the front gate assembly (20) is movable beyond the lower closed position in a direction towards the rear side to an index position.

15. A milking arrangement comprising at least one milking module (1) according to claim 1.

16. A milking module (1), comprising:
a primary end (1') and a secondary end (1") opposite to the primary end (1'), the milking module (1) extending along a longitudinal axis (x) from the primary end (1') to the secondary end (1");
at least two milking places (3) arranged side by side after each other along the longitudinal axis (x), each milking place (3) being configured to receive a respective animal to be milked;
a front side (5), and a rear side (6) opposite the front side (5), both the front side and the rear side extending in directions parallel with the longitudinal axis (x);
a front gate assembly (20) movable between a lower closed position that closes the front side (5) to prevent the animals from leaving the milking places (3) through the front side (5), and an upper open position that permits the animals to leave the milking places (3) through the front side (5);
a further gate assembly (30), movable between a lower position and an upper position above the animals; and
a stationary support structure supporting the front gate assembly (20) and the further gate assembly (30),
wherein the front gate assembly (20) comprises a shaft (23), a front gate (21) attached to the shaft (23), and at least one guide bar (27), the front gate (21) having an inner end located at the shaft (23) and an outer end opposite the inner end, and
wherein the front gate (21), by means of the at least one guide bar (27), is guided along a curved path by means of the at least one guide bar (27) when the front gate assembly (20) is moved between the lower closed position and the upper open position,
wherein the further gate assembly (30) comprises at least two sequence gates (31),
said sequence gates being openable from a closing position, in which the sequence gates extend along a direction parallel with the longitudinal axis (x), to an opening position, in which said at least two sequence gates (31) each extend transversely to the longitudinal axis (x) to permit access to a respective milking place (3), and
wherein the sequence gates (31) are in the closing position when the further gate assembly (30) is in the upper position.

17. A method for milking a group of at least two animals in a milking arrangement with at least one milking module (1) that has at least two milking places (3) arranged side by side after each other along a longitudinal axis (x), each milking place (3) being configured to receive a respective one of the animals to be milked, and a stationary support structure supporting a front gate assembly (20) and a further gate assembly (30) and defining an uppermost point (15) of the milking module (1), the method comprising the steps of:
moving the front gate assembly (20) from an upper open position to a lower closed position closing a front side (5) of the milking module (1) to prevent the animals from leaving the milking places (3) through the front side (5), the front side (5) extending in parallel with the longitudinal axis (x);
moving the further gate assembly (30) from an upper position to a lower position;
leading the animals into the at least one milking module (1), each one of the animals to a respective one of the milking places (3) of the milking module (1);
milking the animals; and
moving a front gate (21) of the front gate assembly (40) along a curved path to the upper open position by means of at least one guide bar (27) to permit the animals to leave the milking module (1), such that an outer end of the front gate (21) is caused to move upwardly in a path along the front side (5) while, simultaneously, an inner end of the front gate (21) is caused to move upwardly and away from the front side (5) toward the rear side (6),
wherein the further gate assembly (30) comprises at least two sequence gates (31),
said sequence gates being openable from a closing position, in which the sequence gates extend along a direction parallel with the longitudinal axis (x), to an opening position, in which said at least two sequence gates (31) each extend transversely to the longitudinal axis (x) to permit access to a respective milking place (3), and wherein the sequence gates (31) are in the closing position when the further gate assembly (30) is in the upper position.

18. The method according to claim 17, further comprising:
moving the further gate assembly (30) from the lower position to the upper position after the animals have reached the milking places (3).

19. The method according to claim 18, further comprising:
moving the further gate assembly (30) from the upper position to the lower position after the milking of the animals has finished, so as to exert a pushing force on the animals in the milking places (3) and thereby urge the animals to leave the milking module (1) through the front side (5).

20. The method according to claim 19, further comprising:
holding each of the sequence gates (31) in the closing position when the further gate assembly (30) is in the upper position and when the further gate assembly (30) is moved from the upper position to the lower position to exert said pushing force.

21. The method according to claim 17, further comprising:
moving the front gate assembly (20) beyond the lower position, in a direction towards the rear side (6), to an index position when the animals have reached the milking places (3) in order to position the animals in an accurate position.

22. The milking module (1) according to claim 16, wherein the inner end of the front gate (21) is located above the sequence gates (31) when the front gate assembly (20) is in the upper open position and the further gate assembly (30) is in the upper position.

* * * * *